US012413895B2

(12) United States Patent
Backman

(10) Patent No.: US 12,413,895 B2
(45) Date of Patent: Sep. 9, 2025

(54) LOUDSPEAKER ASSEMBLY AND HAND-HELD DEVICE

(71) Applicant: AAC Technologies Pte. Ltd., Singapore (SG)

(72) Inventor: Juha Backman, Tampere (FI)

(73) Assignee: AAC Technologies Pte. Ltd., Singapore (SG)

( * ) Notice: Subject to any disclaimer, the term of this patent is extended or adjusted under 35 U.S.C. 154(b) by 376 days.

(21) Appl. No.: 18/094,410

(22) Filed: Jan. 9, 2023

(65) Prior Publication Data

US 2024/0236551 A1 Jul. 11, 2024

(51) Int. Cl.

| | |
|---|---|
| ***H04R 1/24*** | (2006.01) |
| ***H04R 1/28*** | (2006.01) |
| ***H04R 3/12*** | (2006.01) |

(52) U.S. Cl.

CPC ............. *H04R 1/24* (2013.01); *H04R 1/2849* (2013.01); *H04R 3/12* (2013.01); *H04R 2201/028* (2013.01)

(58) Field of Classification Search

CPC .......... H04R 1/24; H04R 1/2849; H04R 3/12; H04R 2201/028; H04R 1/26; H04R 1/38; H04R 3/14; H04R 2499/11; H04R 1/403; H04R 9/06; H04R 9/02; H04R 2400/11

See application file for complete search history.

(56) References Cited

U.S. PATENT DOCUMENTS 9,794,677 B2 * 10/2017 Shetye ................. H04R 5/0335

* cited by examiner

*Primary Examiner* — Brian Ensey
(74) *Attorney, Agent, or Firm* — Wiersch Law Group

(57) ABSTRACT

A loudspeaker assembly and a hand-held device are provided. The loudspeaker assembly includes at least one loudspeaker driver and at least two output ports. The at least one loudspeaker driver and the at least two output ports are configured so that the loudspeaker assembly has a directive polar pattern over a desired frequency range.

18 Claims, 10 Drawing Sheets

LOUDSPEAKER ASSEMBLY AND HAND-HELD DEVICE

TECHNIC FIELD

The various embodiments described in this document relate in general to the field of hand-held devices, and more specifically to a loudspeaker assembly and a hand-held device including the same.

BACKGROUND

In the past decade, mobile phones have become very popular. A loudspeaker assembly is configured in the mobile phone to output received audio, such as music or voice from the opposite end of a call. In some scenarios, it is possible that the loudspeaker assembly is used in a mode that the mobile phone is held in front of a user's face (as opposed to being held to the ear). In such a mode, a loudspeaker in the loudspeaker assembly is often used as a hands-free loudspeaker.

However, a hands-free loudspeaker is known to have significant coloration from the reflections from the user's hands. Accordingly, there is a need to provide a loudspeaker assembly in hand-held devices that can reduce significantly the coloration of sound created by hand reflections, and in stereo use reduce the response differences between channels caused by hand reflections.

SUMMARY

According to one aspect of the present disclosure, a loudspeaker assembly is provided. The loudspeaker assembly includes at least one loudspeaker driver and at least two output ports. The at least one loudspeaker driver and the at least two ports are configured so that the loudspeaker assembly has a unidirectional polar pattern over a desired frequency range.

In some embodiments, the loudspeaker assembly includes at least one or a combination of a loudspeaker unit of a first type, a loudspeaker unit of a second type and a loudspeaker unit of a third type. The loudspeaker unit of the first type has a sealed enclosure and a driver disposed in the sealed enclosure. The loudspeaker unit of the second type has a partially open enclosure and a driver disposed in the partially open enclosure. The loudspeaker unit of the third type has a driver with an open baffle or a driver with acoustically equal cavities on both sides.

In some embodiments, the loudspeaker assembly includes two loudspeaker units of the first type, two audio signal amplifiers and a delay. Two loudspeaker units of the first type have opposite phase, and are fed with separate signals. One of the separate signals is obtained by processing a source signal with one of the two audio signal amplifiers and the delay, and another of the separate signals is obtained by processing the source signal with another of the two audio signal amplifiers.

In some embodiments, the loudspeaker assembly includes a loudspeaker unit of the second type, an audio signal amplifier and an acoustical filter. The acoustical filter is configured to adjust acoustic outputs from two sides of the loudspeaker unit of the second type. The loudspeaker unit of the second type is fed with a signal obtained by processing a source signal with the audio signal amplifier.

In some embodiments, the loudspeaker assembly includes a loudspeaker unit of the first type, a loudspeaker unit of the third type, two audio signal amplifiers and an equalizer. The loudspeaker unit of the first type is fed with a signal obtained by processing a source signal with one of the two audio signal amplifiers, and the loudspeaker unit of the third type is fed with a signal obtained by processing the source signal with another of the two audio signal amplifiers and the equalizer.

In some embodiments, the loudspeaker assembly includes two loudspeaker units of the first type, two loudspeaker front cavities and two output ports. Each of the two loudspeaker units of the first type has a rear cavity, that is space not occupied by the driver in the sealed enclosure. Two rear cavities are next to each other. The two loudspeaker front cavities are arranged at two sides of the two loudspeaker units of the first type, and the two output ports are connected to the two loudspeaker front cavities respectively.

In some embodiments, the loudspeaker assembly includes a loudspeaker unit of the second type, a loudspeaker front cavity, a front output port and a rear output port. The loudspeaker unit of the second type has a rear cavity, that is space not occupied by the driver in the partially open enclosure. The driver in the partially open enclosure is facing the loudspeaker front cavity. The rear cavity is next to the rear output port. The rear output port is provided with an acoustic resistance element on a side wall that is different from a side wall next to the rear cavity.

In some embodiments, the loudspeaker assembly further includes a loudspeaker housing, configured to accommodate the at least one loudspeaker driver. The at least two output ports includes two output ports, connected to the loudspeaker housing.

In some embodiments, the loudspeaker assembly includes at least one or a combination of a wideband or low-frequency loudspeaker with an omnidirectional polar pattern, and a wideband or high frequency loudspeaker, with a cardioid, dipole or other directional polar pattern, or with an omnidirectional polar pattern.

In some embodiments, the loudspeaker assembly includes a loudspeaker housing, two omnidirectional loudspeaker units disposed in the loudspeaker housing, and two output ports connected to the loudspeaker housing.

In some embodiments, the loudspeaker assembly includes a first loudspeaker housing, an omnidirectional loudspeaker unit disposed in the first loudspeaker housing, a first output port connected to the first loudspeaker housing, a second loudspeaker housing, a cardioid loudspeaker unit disposed in the second loudspeaker housing, and a second output port and a third output port connected to the second loudspeaker housing;

In some embodiments, the loudspeaker assembly includes a first loudspeaker housing, a wideband loudspeaker unit disposed in the first loudspeaker housing, a first output port connected to the first loudspeaker housing, a second loudspeaker housing, a high frequency loudspeaker unit disposed in the second loudspeaker housing, and a second output port connected to the second loudspeaker housing. The first and second output ports are facing towards a same direction;

In some embodiments, the loudspeaker assembly includes a first loudspeaker housing, a wideband loudspeaker unit disposed in the first loudspeaker housing, a first output port connected to the first loudspeaker housing, a second loudspeaker housing, a high frequency loudspeaker unit disposed in the second loudspeaker housing, and a second output port connected to the second loudspeaker housing. The first and second output ports are facing towards different directions.

In some embodiments, the loudspeaker assembly includes a first loudspeaker housing, a first omnidirectional unit disposed in the first loudspeaker housing, a first output port connected to the first loudspeaker housing, a second loudspeaker housing, a dipole loudspeaker unit disposed in the second loudspeaker housing, and a second output port and a third output port connected to the second loudspeaker housing, a third loudspeaker housing, a second omnidirectional unit disposed in the third loudspeaker housing, and a fourth output port connected to the third loudspeaker housing. The first loudspeaker housing and the third loudspeaker housing are arranged at two sides of the second loudspeaker housing. All the output ports are facing towards a same direction and are arranged symmetrically around a common center point;

In some embodiments, the loudspeaker assembly includes a first loudspeaker housing, an omnidirectional unit disposed in the first loudspeaker housing, a first output port and a second output port connected to the first loudspeaker housing, a second loudspeaker housing, a dipole loudspeaker unit disposed in the second loudspeaker housing, a third output port and a fourth output port connected to the second loudspeaker housing. All the output ports are facing towards a same direction and the first and second output ports are arranged symmetrically relative to the omnidirectional loudspeaker unit.

According to another aspect of the present disclosure, a hand-held device is provided. The hand-held device includes a device housing, and a loudspeaker assembly disposed in the device housing. The loudspeaker assembly may be described as above.

BRIEF DESCRIPTION OF THE DRAWINGS

The present embodiments are illustrated by way of example and not limitation in the figures of the accompanying drawings, in which like references may indicate similar elements.

DETAILED DESCRIPTION OF THE EMBODIMENTS

Figure 1:
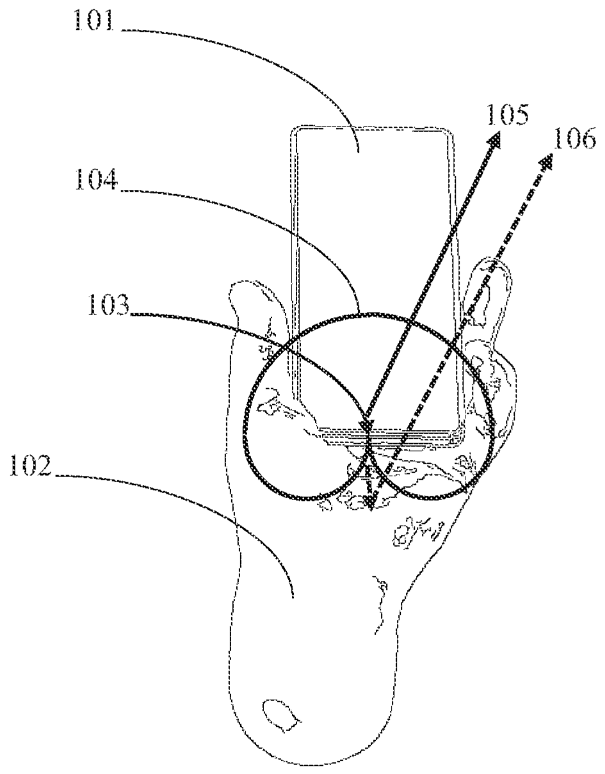
FIG. 1 illustrates a main principle in accordance with some embodiments of the present disclosure.

This specification discloses one or more embodiments that incorporate the features of this disclosure. The disclosed embodiment(s) merely exemplify the disclosure. The scope of the disclosure is not limited to the disclosed embodiment(s). The disclosure is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

There are various implementations for reducing coloration from the reflections from the user's hands. The embodiments of the present disclosure are related to loudspeaker arrangements in a hand-held device. In the arrangements, loudspeaker(s) of a first type (which may be a wideband or low-frequency loudspeaker with an Omnidirectional polar pattern) and loudspeaker(s) of a second type (which may be a wideband or high frequency loudspeaker, with a cardioid, dipole or other directional polar pattern, or in some implementations, an omnidirectional loudspeaker) are provided. Moreover, respective numbers and layouts of the loudspeakers of the first and second types are designed, and the relative phase and/or response magnitude between the loudspeakers of the first and second types are adjusted in corresponding transition frequency ranges. In this way, a sound field with a directive polar pattern over the desired frequency range can be obtained, and the coloration of sound created by hand reflections can be reduced significantly.

The basic principles of creating loudspeakers with unidirectional (cardioid) polar pattern are well known, but they have not been widely applied to portable devices.

The principle of creating a cardioid polar pattern in an electroacoustic transducer emerged first in microphone designs in 1933 and was later adopted to loudspeaker design either as passive designs (e.g. acoustic resistance enclosures) or through the use of multiple drivers with active electronics. The use of directional loudspeakers in mobile devices is not common due to dynamic range loss of most implementations. That is, the basic principles of creating loudspeakers with unidirectional (cardioid) polar pattern are well known, but they have not been widely applied to portable devices.

In addition, the use of directional microphones is somewhat common in telecommunications applications, especially in accessories, but there are only a few attempts to use directional loudspeakers. One well-known reason for avoiding directional loudspeakers is that their maximum output especially at low frequencies is limited, and the required acoustical symmetry imposes constraints on the acoustical design and driver placement. The low-frequency problem is also addressed in the present disclosure.

FIG. 1 illustrates a main principle of the present disclosure, providing a handheld device with a loudspeaker that directs most of the sound away from the user's hands.

As shown in FIG. 1, a handheld device 101 providing loudspeaker ports 103 is held by a user's hand 102. The sound radiated from the loudspeaker ports 103 is in a sound field with a directive polar pattern, for example, a cardioid polar pattern 104. The sound directly radiated from the loudspeaker ports 103 is directed away from the user's hand in a direction representing as 105 and the sound that is attenuated and reflected from the user's hand is directed away from the user's hand in a direction representing as 106.

In addition, the loudspeaker ports 103 are arranged in a way that directional response is obtained in the loudspeaker close to the user's hand or close to a surface (existing technology describes handheld device loudspeakers that function well only when the device is essentially in the free air), and providing frequency-dependent polar pattern where the transition frequency is defined according to the hand-device acoustical interaction. The new features of the embodiments of the present disclosure have not been presented in any known implementation of portable device loudspeaker.

It should be appreciated by those of skill in the art that, gradient loudspeakers typically require a large amount of low-frequency boost to achieve flat on-axis response, since their operation relies on cancelling part of the radiated sound by having either the loudspeakers wired out of phase with suitable delays and equalization, or by utilizing the out-of-phase back radiation of an individual loudspeaker driver. This can be acceptable in large loudspeaker assemblies, such as sound reinforcement systems where the principle is becoming increasingly more popular, but in telecommunications loudspeakers the low-frequency output capability is limited, and so the loudspeaker should preferably be operated in an omnidirectional mode at low frequencies.

Simulations and measurements indicate that the user's hand provides no significant boost to a loudspeaker's below 500 Hz, and the boost increases, but remains relatively angle-independent up to about 1500-2000 Hz. This implies that an omnidirectional loudspeaker is usable up to about 1000-1500 Hz, and above that directional operation is preferable, while a directional loudspeaker loses some efficiency at low frequencies when held in hand, so omnidirectional operation is preferable at lower frequencies. Some methods for achieving the desired operation can be divided into two main categories:

Using a frequency dependent phase inversion, achieved e.g. through application of inverting all-pass filters between two separate transducers, and optionally frequency dependent delay difference so that at low frequencies both transducers radiate essentially in phase. This approach maximizes the available low-frequency output for a given number of transducers.

Attenuating the low-frequency output of one transducer, so that cancellation occurs only in a portion of the frequency range. This approach allows the high-frequency transducer to be designed for smaller size. Also in this case frequency dependent delay and phase inversion can be applied, and they are beneficial, but not essential. This approach is not known from existing technology for any type of loudspeaker.

If the unidirectional radiation is achieved through a combination of a dipole and omnidirectional acoustical source, then it is preferable to use two output ports for the omnidirectional source, placed symmetrically around the center of the dipole radiator ports so that the unidirectional radiation characteristics are achieved over a very wide frequency range.

If the polar pattern is implemented as frequency dependent, then a preferred transition frequency range from omnidirectional operation to unidirectional operation is with typical smart phone or handheld game set is from approximately 800 Hz to approximately 2000 Hz.

In conclusion, the embodiments of the present disclosure can reduce significantly the coloration of sound created by hand reflections, and in stereo use reduces the response differences between channels caused by hand reflections.

In some embodiments, a loudspeaker assembly is provided. The loudspeaker assembly includes at least one loudspeaker driver and at least two output ports. The at least one loudspeaker driver and the at least two ports are configured so that at least the loudspeaker assembly close to the hand of the user has unidirectional (typically cardioid) polar pattern over a desired frequency range (e.g. across either the entire frequency range or only at high frequencies). The implementation alternatives and the expected performance are discussed in more detail in the following illustration.

Figure 2A:
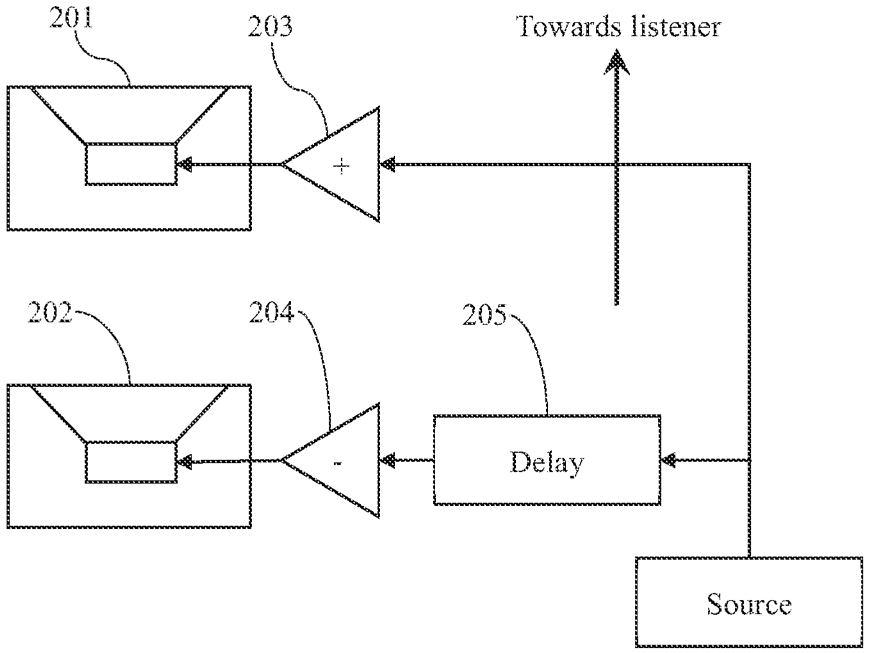
FIG. 2A is a schematic diagram of a loudspeaker assembly in accordance with an embodiment of the present disclosure.

FIG. 2A is a schematic diagram of a loudspeaker assembly in accordance with an embodiment of the present disclosure.

As shown in FIG. 2A, the loudspeaker assembly includes two loudspeaker units 201 and 202, two audio signal amplifiers 203 and 204, and a delay 205. Each of the two loudspeaker units 201 and 202 has a sealed enclosure and a driver disposed in the sealed enclosure. The two loudspeaker units 201 and 202 are omnidirectional. The same source signal, with possible delay and/or equalization is fed to both loudspeaker units to achieve the desired polar pattern. For example, FIG. 2A shows an implementation where two essentially identical loudspeakers with opposite phase are fed with separate signals, and the signal to one of the loudspeakers is delayed so that the sound radiated away from the listener is cancelled to a large extent.

In this embodiment, the desired polar pattern is achieved by a combination of the acoustic outputs of two units with essentially identical polar patterns, and with signal processing applied to the input signals of the units.

Figure 2B:
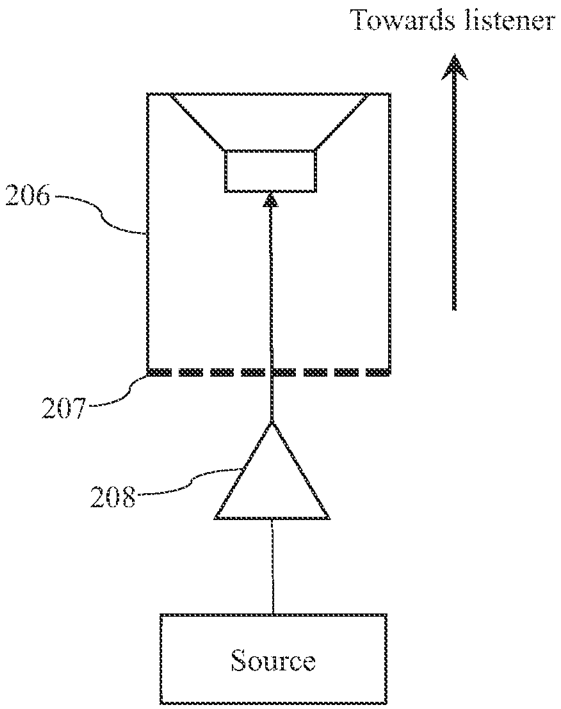
FIG. 2B is a schematic diagram of a loudspeaker assembly in accordance with another embodiment of the present disclosure.

FIG. 2B is a schematic diagram of a loudspeaker assembly in accordance with another embodiment of the present disclosure.

As shown in FIG. 2B, the loudspeaker assembly includes a loudspeaker unit 206 and an audio signal amplifier 208. The loudspeaker unit 206 has a partially open loudspeaker enclosure, and a driver disposed in the enclosure. For example, FIG. 2B shows an implementation where an acoustical filter, including a cavity behind a loudspeaker driver (that is, a cavity is not occupied by the driver in the partially open enclosure) and an acoustical resistance element 207, such as perforated or porous material, is behind the driver. The acoustical filter then forms a suitable delay.

Figure 2C:
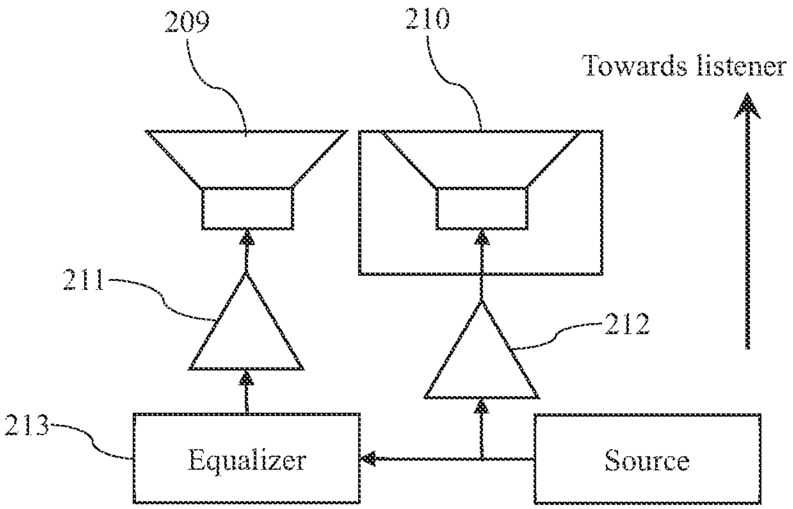
FIG. 2C is a schematic diagram of a loudspeaker assembly in accordance with a further embodiment of the present disclosure.

In this embodiment, the desired polar pattern is achieved by adjusting the acoustic outputs from two sides of a loudspeaker unit with purely acoustical means FIG. 2C is a schematic diagram of a loudspeaker assembly in accordance with a further embodiment of the present disclosure.

As shown in FIG. 2C, the loudspeaker assembly includes two loudspeaker units 209 and 210, two audio signal amplifiers 211 and 212, and an equalizer 213. One 209 of the two loudspeaker units is dipole, and another 210 of the two loudspeaker units is omnidirectional. Again, the same source signal, with possible delay and/or equalization is fed to both loudspeaker units to achieve the desired polar pattern. For example, FIG. 2C shows a combination of an omnidirectional loudspeaker (e.g. a small sealed loudspeaker enclosure) and a dipole loudspeaker (e.g. an open-baffle loudspeaker or a driver with acoustically equal cavities ports on both sides), equalized so that the omnidirectional and dipole loudspeakers create each identical on-axis response, so that their acoustical sum forms a cardioid response.

In this embodiment, the desired polar pattern is achieved by a combination of two units acoustically different polar patterns and with signal processing applied to the input signals of the units.

In conclusion, the desired polar pattern is achieved through 1) as an acoustic sum of two (or more) individual loudspeaker drivers, with suitably delayed/equalized signals, or 2) through purely acoustical means (ports, cavities, and resistance elements) using single driver to achieve the desired polar pattern. FIG. 2A and FIG. 2C are two exemplary structures for illustrating the first means, and FIG. 2B is an exemplary structure for illustrating the second means. However, the present disclosure is not limited to the structures illustrated above, and other structures belonging to the same concept of the present disclosure may be derived according to the structures illustrated above. In addition, it should be appreciated by those of skill in the art that, there are some commonly used structures in some commercial loudspeakers with cardioid polar pattern (e.g. the midrange units for some models of the Finnish brands Gradient and Amphion), and in most cardioid microphones. The idea is that the acoustic system formed by the cavity and the resistance introduces a frequency dependent phase change, and the physical distance between the front and rear sides of the system provides an angle-dependent phase difference, and on the other hand, the cavity-resistance combination attenuates the higher frequencies which then helps to maintain a frequency independent polar pattern.

In some embodiments, to achieve the desired frequency variable polar pattern, all the loudspeakers won't in some cases reproduce the entire frequency range. FIG. 2A, FIG. 2B and FIG. 2C however, illustrate the possible means of achieving the preferred cardioid polar pattern, and in this sense the outputs of all the units cover the frequency range where the cardioid polar pattern is used.

It should be appreciated that a direction shown as "Towards listener" in FIG. 2A, FIG. 2B and FIG. 2C may be understood as a direction directing to a user's hand when the user holds a hand-held device in his/her hand.

Figure 3:
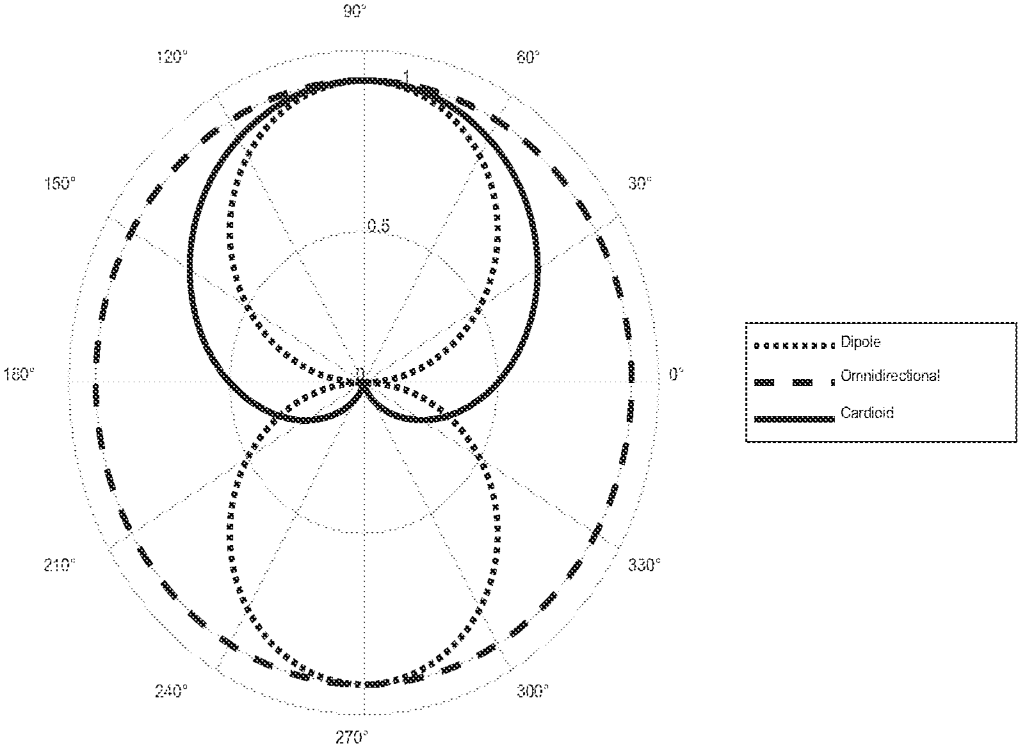
FIG. 3 is a schematic diagram for illustrating creating a cardioid (unidirectional) polar pattern from omnidirectional and dipole components in accordance with some embodiments of the present disclosure.

FIG. 3 is a schematic diagram for illustrating creating a cardioid (unidirectional) polar pattern from omnidirectional and dipole components in accordance with some embodiments of the present disclosure.

Figure 4:
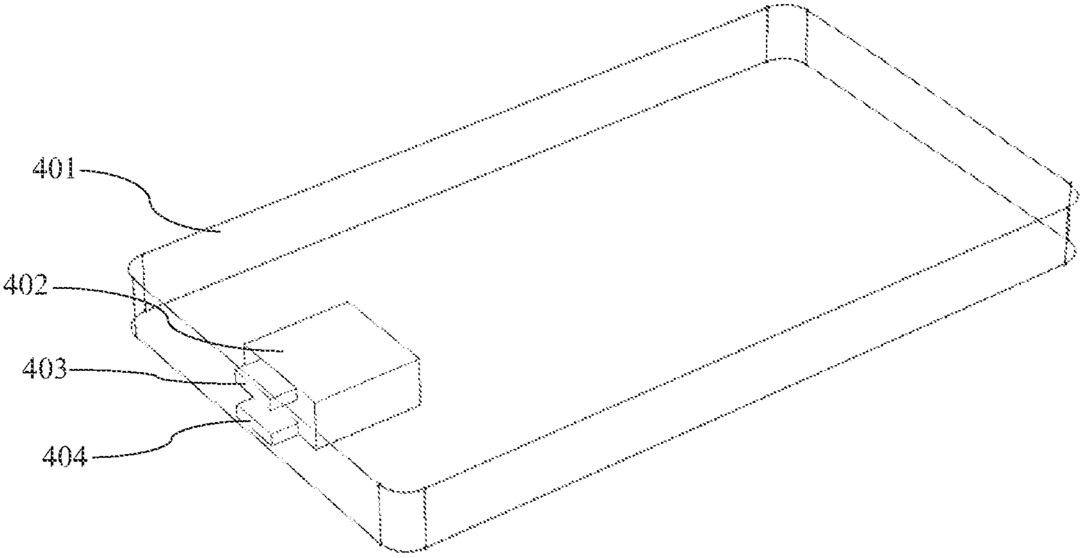
FIG. 4 is a schematic diagram for illustrating an exemplary layout of a loudspeaker assembly in accordance with some embodiments.

FIG. 4 is a schematic diagram for illustrating an exemplary layout of a loudspeaker assembly in accordance with some embodiments. As an example, a basic layout of a loudspeaker assembly a typical arrangement of ports is shown, to obtain the desired directional operation. In this example, a loudspeaker assembly has a loudspeaker housing 402 configured to accommodate at least one loudspeaker driver, and a hand-held device has a device housing 401 configured to accommodate the loudspeaker assembly. The loudspeaker assembly has two output ports 403 and 404, and the device housing 401 has an opening through which sound from two output ports 403 and 404 radiates. Two output ports 403 and 404 may be arranged on a same side surface of the device housing 401. In some embodiments, the opening may also be alternatively implemented with groups of smaller openings.

Figure 5A:
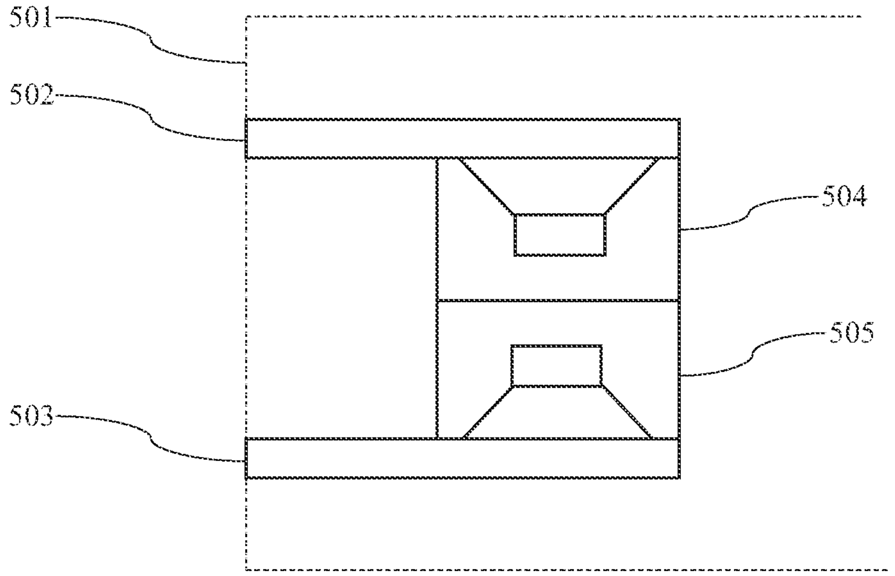
FIG. 5A and FIG. 5B show examples of implementing the principles described in FIG. 2A and FIG. 2B in the exemplary layout of FIG. 4 in accordance with some embodiments.
Figure 5B:
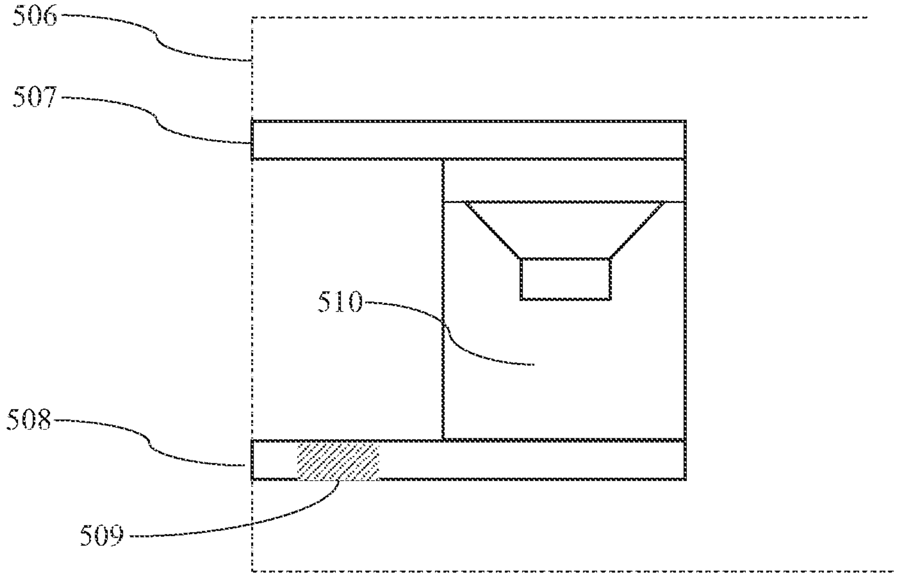

FIG. 5A and FIG. 5B show examples of implementing the principles described in FIG. 2A and FIG. 2B in the exemplary layout of FIG. 4 in accordance with some embodiments.

As shown in FIG. 5A, a device housing outline is shown as 501, and a loudspeaker assembly is accommodated in the device housing. The loudspeaker assembly includes two loudspeaker front cavities, two ports 502 and 503, two loudspeaker drivers and two rear cavities 504 and 505. Two loudspeaker drivers are facing two loudspeaker front cavities respectively, and two rear cavities 504 and 505 are next to each other. The rear cavity may be space, that is not occupied by the driver in the sealed enclosure or in the partially open enclosure, as described above.

As shown in FIG. 5B, a device housing outline is shown as 506, and a loudspeaker assembly is accommodated in the device housing. The loudspeaker assembly includes a loudspeaker front cavity, a front port 507, a rear port 508, a loudspeaker driver and a rear cavity 510. The loudspeaker driver is facing the loudspeaker front cavity. The rear cavity 510 is next to the rear port 508. The rear port 508 is provided with an acoustic resistance element 509 on a side wall that is different from a side wall next to the rear cavity 510. In this embodiment, the loudspeaker may be a cardioid loudspeaker.

Figure 6A:
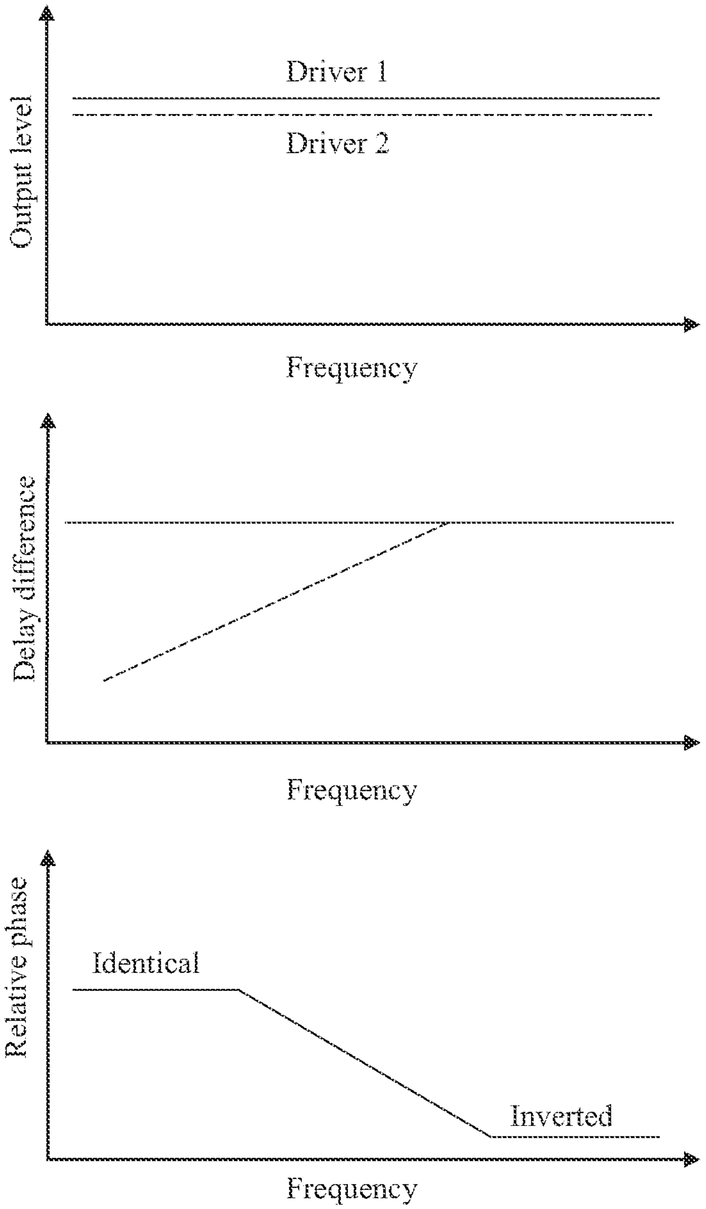
FIG. 6A and FIG. 6B show schematically methods of implementing a frequency-dependent polar pattern in a two-loudspeaker arrangement corresponding to FIG. 2A in accordance with some embodiments.
Figure 6B:
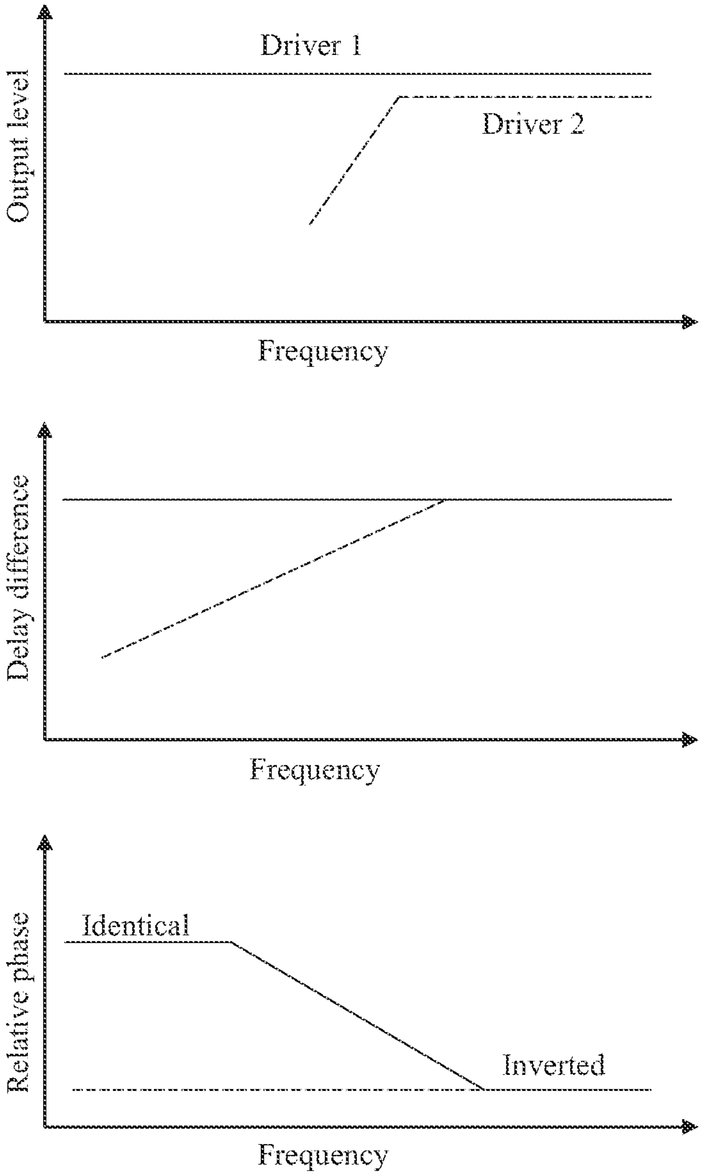

FIG. 6A and FIG. 6B show schematically methods of implementing a frequency-dependent polar pattern in a two-loudspeaker arrangement corresponding to FIG. 2A in accordance with some embodiments. FIG. 6A shows when both loudspeakers reproduce essentially the same frequency range, and the transition from omnidirectional (low frequencies) is done by means of adjusting the relative phase and the relative delay of the two transducers, and FIG. 6B shows when the delay difference between loudspeakers is approximately constant over the commonly reproduced frequency range, and the magnitude of the acoustical output of one loudspeaker is reduced at low frequencies.

Figure 7:
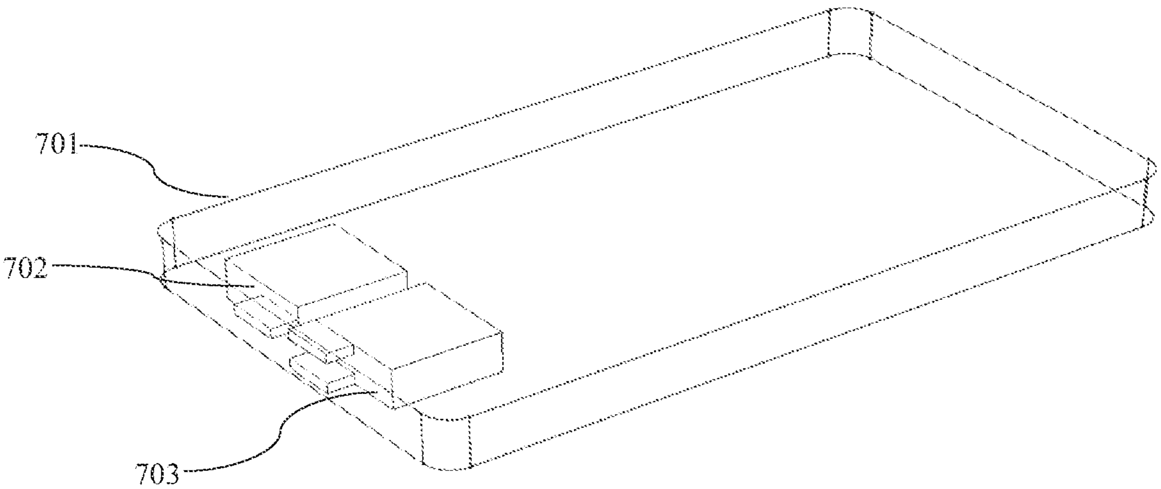
FIG. 7 is a schematic diagram for illustrating an exemplary layout of a loudspeaker assembly including two loudspeaker units in accordance with some embodiments.

FIG. 7 is a schematic diagram for illustrating an exemplary layout of a loudspeaker assembly including two loudspeaker units in accordance with some embodiments. As shown in FIG. 7, for example, an omnidirectional (low-frequency) loudspeaker and a cardioid (high-frequency) loudspeaker are built in a device housing 701 as separate units 702 and 703. The output port of the omnidirectional (low-frequency) loudspeaker unit and the output ports of the cardioid (high-frequency) loudspeaker unit are arranged on a same side surface of the device housing 701.

Figure 8:
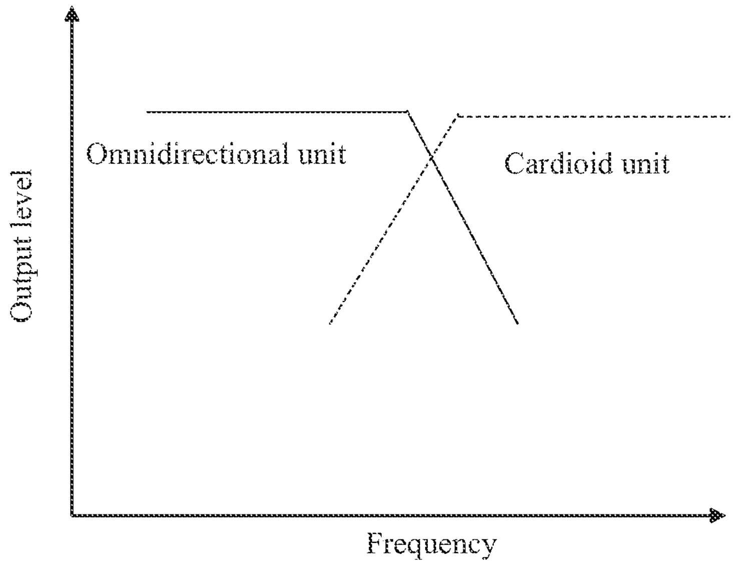
FIG. 8 shows schematically the cross-over between low-frequency and high-frequency units of FIG. 7.

FIG. 8 shows schematically the cross-over between low-frequency and high-frequency units of FIG. 7.

Figure 9:
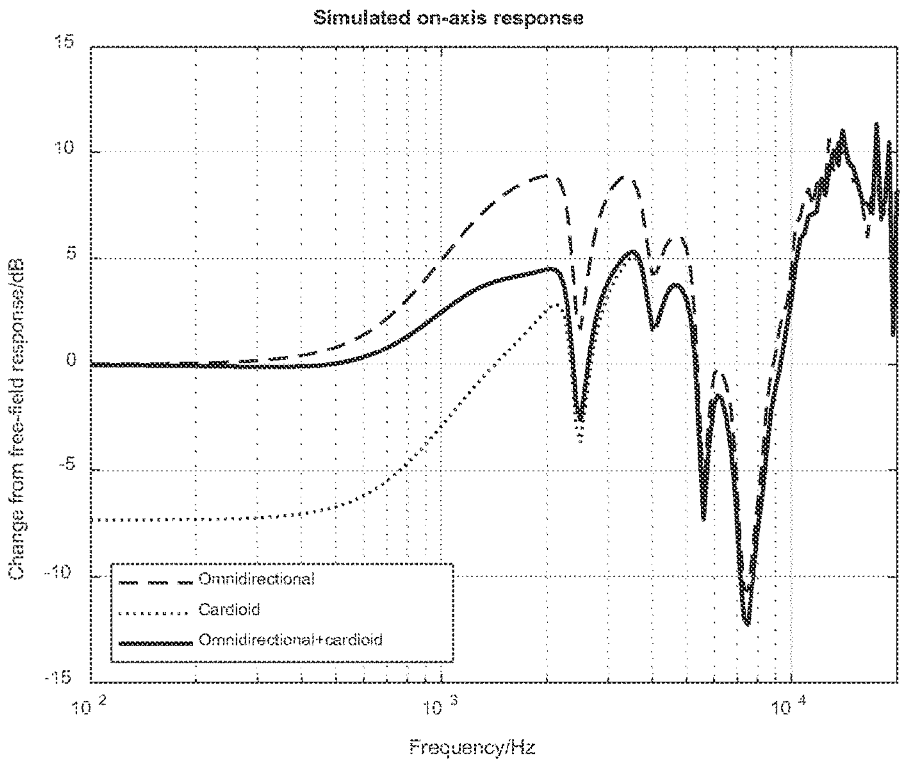
FIG. 9 shows an example of simulated on-axis (i.e. towards the listener) frequency response for a hand-held device.

FIG. 9 shows an example of simulated on-axis (i.e. towards the listener) frequency response for a hand-held device. FIG. 9 shows the device respectively equipped with a conventional (omnidirectional) loudspeaker, with a cardioid loudspeaker, and with a combination of omnidirectional and cardioid loudspeakers, with the transition from omnidirectional to cardioid happening at a frequency range around 1200 Hz.

FIGS. 10-13 are exemplary arrangements of loudspeaker assemblies in accordance with some embodiments.

Figure 10:
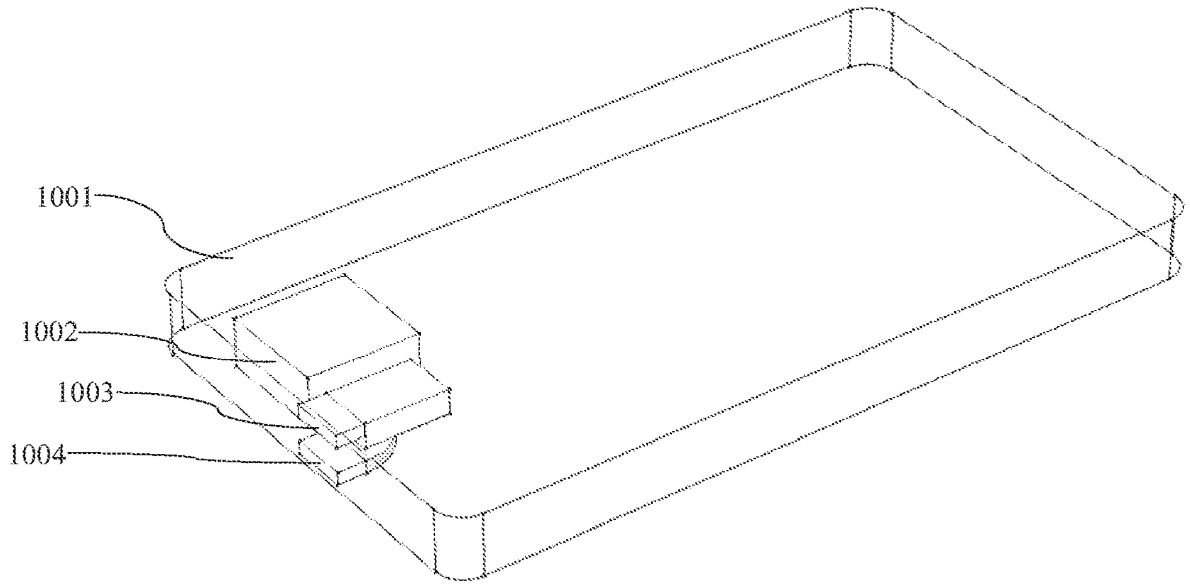
FIGS. 10-13 are exemplary arrangements of loudspeaker assemblies in accordance with some embodiments.

As an example, FIG. 10 shows a possible arrangement of wide-band and high-frequency loudspeakers for implementing the responses of FIG. 6B. In this example, a loudspeaker assembly, including a wideband loudspeaker unit 1002, a wideband output port 1004, a high frequency loudspeaker unit and a high frequency output port 1003, is accommodated in a device housing 1001. The high frequency output port 1003 and the wideband output port 1004 are facing towards a same direction, and are arranged on a same side surface of the device housing 1001.

Figure 11:
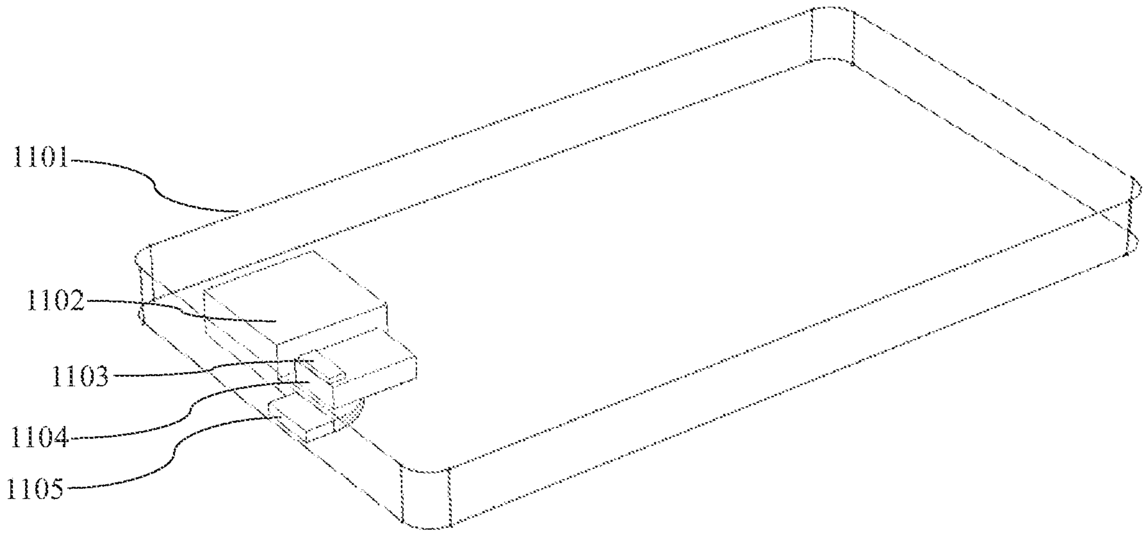

As an example, FIG. 11 shows an alternative arrangement of wide-band and high-frequency loudspeakers for implementing the responses of FIG. 6B. In this example, a loudspeaker assembly, including a wideband loudspeaker unit 1102, a wideband output port 1105, a high frequency loudspeaker unit 1104 and a high frequency output port 1103, is accommodated in a device housing 1101. The high frequency output port 1103 and the wideband output port 1105 are facing towards different directions, and are arranged on different side surfaces of the device housing 1101. Furthermore, the high-frequency loudspeaker unit 1104 may be used also as a telephone earpiece, and the high frequency output port may be used also as an earpiece output port.

Figure 12:
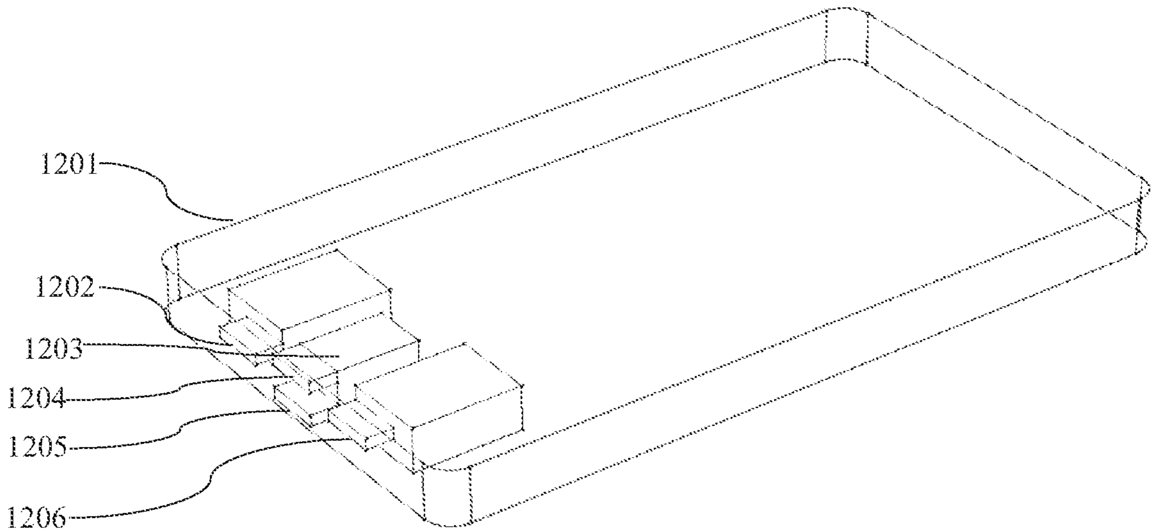

FIG. 12 shows an implementation of combined dipole and omnidirectional loudspeakers, with two separate loudspeaker units for the wideband omnidirectional part, and with the ports arranged symmetrically around the common center point. As shown in FIG. 12, a loudspeaker assembly includes a first omnidirectional loudspeaker unit with a first omnidirectional loudspeaker output port 1202, a dipole loudspeaker unit 1203 with a first dipole loudspeaker output port 1204 and a second dipole loudspeaker output port 1205, and a second omnidirectional loudspeaker unit with a second omnidirectional loudspeaker output port 1206. All the units and ports are accommodated in a device housing 1201. All the ports 1202, 1204, 1205 and 1206 are facing towards a same direction, are arranged on a same side surface of the device housing 1201, and are arranged symmetrically around the common center point.

Figure 13:
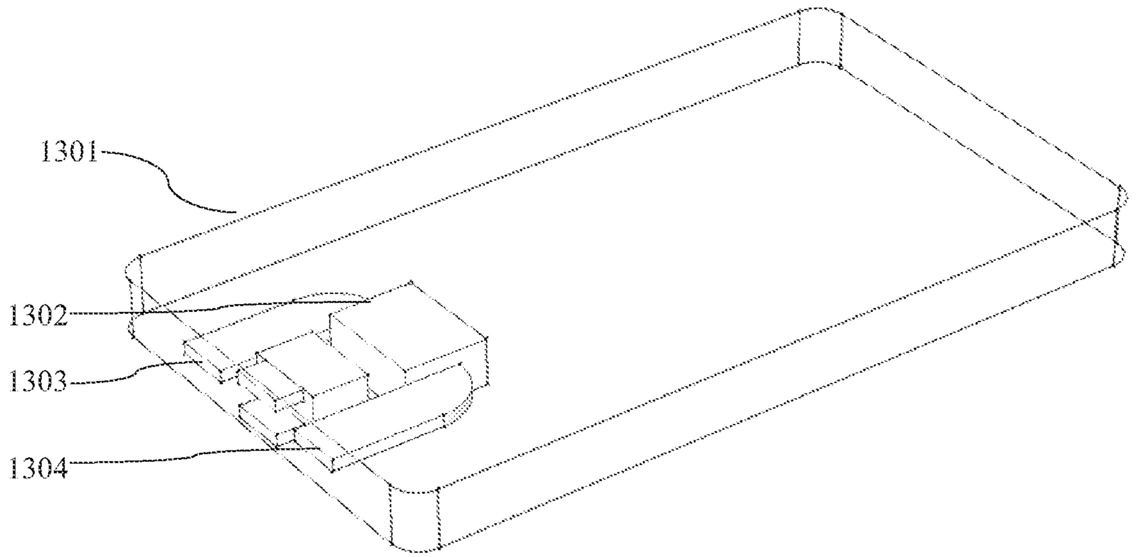

FIG. 13 shows an alternative implementation of combined dipole and omnidirectional loudspeakers with one wideband loudspeaker with two symmetrical ports. As shown in FIG. 13, a loudspeaker assembly includes an omnidirectional loudspeaker unit 1302 with a first omnidirectional loudspeaker output port 1303 and a second omnidirectional loudspeaker output port 1303, and a dipole loudspeaker unit with two dipole loudspeaker output ports. All the units and ports are accommodated in a device housing 1301. All the ports are facing towards a same direction, and are arranged on a same side surface of the device housing 1301. The ports 1302 and 1303 are arranged symmetrically relative to the omnidirectional loudspeaker unit 1302.

Figure 14:
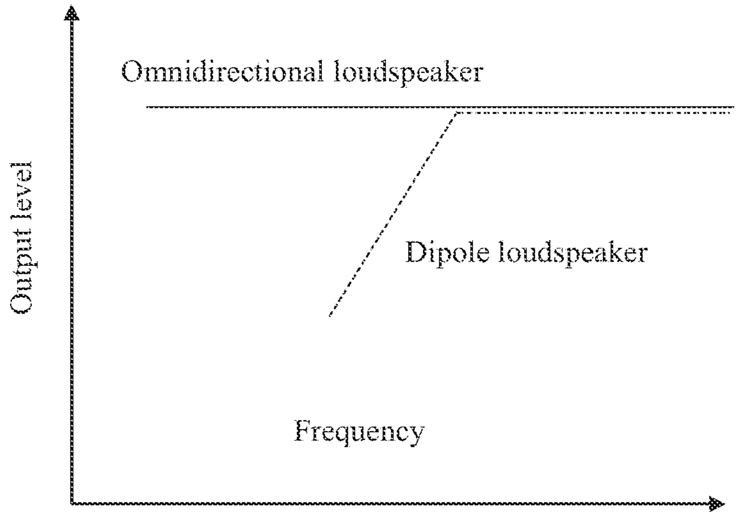
FIG. 14 shows schematically a frequency dependence of acoustical outputs of systems in FIG. 12 and FIG. 13.

FIG. 14 shows schematically a frequency dependence of acoustical outputs of systems in FIG. 12 and FIG. 13 to obtain frequency dependent polar pattern.

It will be understood that, although the terms first, second, etc., are, in some instances, used herein to describe various elements, these elements should not be limited by these terms. These terms are only used to distinguish one element from another. For example, a first omnidirectional loudspeaker output port could be termed a second omnidirectional loudspeaker output port, and, similarly, a second omnidirectional loudspeaker output port could be termed a first omnidirectional loudspeaker output port, without departing from the scope of the various described embodiments.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A loudspeaker assembly, comprising:

at least one loudspeaker driver and at least two output ports;

wherein the at least one loudspeaker driver and the at least two output ports are configured so that the loudspeaker assembly has a directive polar pattern over a desired frequency range;

the loudspeaker assembly includes at least one or a combination of:

a loudspeaker unit of a first type, having a sealed enclosure and a driver disposed in the sealed enclosure;

a loudspeaker unit of a second type, having a partially open enclosure and a driver disposed in the partially open enclosure; and a loudspeaker unit of a third type, having a driver with an open baffle or a driver with acoustically equal cavities on both sides.

2. The loudspeaker assembly according to claim 1, wherein the loudspeaker assembly includes two loudspeaker units of the first type, two audio signal amplifiers and a delay;

wherein two loudspeaker units of the first type have opposite phase, and are fed with separate signals; one of the separate signals is obtained by processing a source signal with one of the two audio signal amplifiers and the delay, and another of the separate signals is obtained by processing the source signal with another of the two audio signal amplifiers.

3. The loudspeaker assembly according to claim 1, wherein the loudspeaker assembly includes a loudspeaker unit of the second type, an audio signal amplifier and an acoustical filter;

wherein the acoustical filter is configured to adjust acoustic outputs from two sides of the loudspeaker unit of the second type;

wherein the loudspeaker unit of the second type is fed with a signal obtained by processing a source signal with the audio signal amplifier.

4. The loudspeaker assembly according to claim 1, wherein the loudspeaker assembly includes a loudspeaker unit of the first type, a loudspeaker unit of the third type, two audio signal amplifiers and an equalizer;

wherein the loudspeaker unit of the first type is fed with a signal obtained by processing a source signal with one of the two audio signal amplifiers, and the loudspeaker unit of the third type is fed with a signal obtained by processing the source signal with another of the two audio signal amplifiers and the equalizer.

5. The loudspeaker assembly according to claim 1, wherein the loudspeaker assembly includes two loudspeaker units of the first type, two loudspeaker front cavities and two output ports;

each of the two loudspeaker units of the first type has a rear cavity, that is space not occupied by the driver in the sealed enclosure;

two rear cavities are next to each other;

the two loudspeaker front cavities are arranged at two sides of the two loudspeaker units of the first type, and the two output ports are connected to the two loudspeaker front cavities respectively.

6. The loudspeaker assembly according to claim 1, wherein the loudspeaker assembly includes a loudspeaker unit of the second type, a loudspeaker front cavity, a front output port and a rear output port;

the loudspeaker unit of the second type has a rear cavity, that is space not occupied by the driver in the partially open enclosure;

the driver in the partially open enclosure is facing the loudspeaker front cavity;

the rear cavity is next to the rear output port;

the rear output port is provided with an acoustic resistance element on a side wall that is different from a side wall next to the rear cavity.

7. The loudspeaker assembly according to claim 1, further comprising a loudspeaker housing, configured to accommodate the at least one loudspeaker driver;

wherein the at least two output ports includes two output ports, connected to the loudspeaker housing.

8. The loudspeaker assembly according to claim 1, wherein the loudspeaker assembly includes at least one or a combination of:

a wideband or low-frequency loudspeaker with an omnidirectional polar pattern; and a wideband or high frequency loudspeaker, with a cardioid, dipole or other directional polar pattern, or with an omnidirectional polar pattern.

9. The loudspeaker assembly according to claim 1, wherein the loudspeaker assembly includes a loudspeaker housing, two omnidirectional loudspeaker units disposed in the loudspeaker housing, and two output ports connected to the loudspeaker housing;

or the loudspeaker assembly includes a first loudspeaker housing, an omnidirectional loudspeaker unit disposed in the first loudspeaker housing, a first output port connected to the first loudspeaker housing, a second loudspeaker housing, a cardioid loudspeaker unit disposed in the second loudspeaker housing, and a second output port and a third output port connected to the second loudspeaker housing;

or the loudspeaker assembly includes a first loudspeaker housing, a wideband loudspeaker unit disposed in the first loudspeaker housing, a first output port connected to the first loudspeaker housing, a second loudspeaker housing, a high frequency loudspeaker unit disposed in the second loudspeaker housing, and a second output port connected to the second loudspeaker housing, and the first and second output ports are facing towards a same direction;

or the loudspeaker assembly includes a first loudspeaker housing, a wideband loudspeaker unit disposed in the first loudspeaker housing, a first output port connected to the first loudspeaker housing, a second loudspeaker housing, a high frequency loudspeaker unit disposed in the second loudspeaker housing, and a second output port connected to the second loudspeaker housing, and the first and second output ports are facing towards different directions;

or the loudspeaker assembly includes a first loudspeaker housing, a first omnidirectional unit disposed in the first loudspeaker housing, a first output port connected to the first loudspeaker housing, a second loudspeaker housing, a dipole loudspeaker unit disposed in the second loudspeaker housing, and a second output port and a third output port connected to the second loudspeaker housing, a third loudspeaker housing, a second omnidirectional unit disposed in the third loudspeaker housing, and a fourth output port connected to the third loudspeaker housing, the first loudspeaker housing and the third loudspeaker housing are arranged at two sides of the second loudspeaker housing, and all the output ports are facing towards a same direction and are arranged symmetrically around a common center point;

or the loudspeaker assembly includes a first loudspeaker housing, an omnidirectional unit disposed in the first loudspeaker housing, a first output port and a second output port connected to the first loudspeaker housing, a second loudspeaker housing, a dipole loudspeaker unit disposed in the second loudspeaker housing, a third output port and a fourth output port connected to the second loudspeaker housing, all the output ports are facing towards a same direction and the first and second output ports are arranged symmetrically relative to the omnidirectional loudspeaker unit.

10. A hand-held device, comprising:

a device housing, and a loudspeaker assembly, disposed in the device housing;

wherein the loudspeaker assembly includes:

at least one loudspeaker driver and at least two output ports;

wherein the at least one loudspeaker driver and the at least two output ports are configured so that the loudspeaker assembly has a directive polar pattern over a desired frequency range;

the loudspeaker assembly includes at least one or a combination of:

a loudspeaker unit of a first type, having a sealed enclosure and a driver disposed in the sealed enclosure;

a loudspeaker unit of a second type, having a partially open enclosure and a driver disposed in the partially open enclosure; and a loudspeaker unit of a third type, having a driver with an open baffle or a driver with acoustically equal cavities ports on both sides.

11. The hand-held device according to claim 10, wherein the loudspeaker assembly includes two loudspeaker units of the first type, two audio signal amplifiers and a delay;

wherein two loudspeaker units of the first type have opposite phase, and are fed with separate signals; one of the separate signals is obtained by processing a source signal with one of the two audio signal amplifiers and the delay, and another of the separate signals is obtained by processing the source signal with another of the two audio signal amplifiers.

12. The hand-held device according to claim 10, wherein the loudspeaker assembly includes a loudspeaker unit of the second type, an audio signal amplifier and an acoustical filter;

wherein the acoustical filter is configured to adjust acoustic outputs from two sides of the loudspeaker unit of the second type;

wherein the loudspeaker unit of the second type is fed with a signal obtained by processing a source signal with the audio signal amplifier.

13. The hand-held device according to claim 10, wherein the loudspeaker assembly includes a loudspeaker unit of the first type, a loudspeaker unit of the third type, two audio signal amplifiers and an equalizer;

wherein the loudspeaker unit of the first type is fed with a signal obtained by processing a source signal with one of the two audio signal amplifiers, and the loudspeaker unit of the third type is fed with a signal obtained by processing the source signal with another of the two audio signal amplifiers and the equalizer.

14. The hand-held device according to claim 10, wherein the loudspeaker assembly includes two loudspeaker units of the first type, two loudspeaker front cavities and two output ports;

each of the two loudspeaker units of the first type has a rear cavity, that is space not occupied by the driver in the sealed enclosure;

two rear cavities are next to each other;

the two loudspeaker front cavities are arranged at two sides of the two loudspeaker units of the first type, and the two output ports are connected to the two loudspeaker front cavities respectively.

15. The hand-held device according to claim 10, wherein the loudspeaker assembly includes a loudspeaker unit of the second type, a loudspeaker front cavity, a front output port and a rear output port;

the loudspeaker unit of the second type has a rear cavity, that is space not occupied by the driver in the partially open enclosure;

the driver in the partially open enclosure is facing the loudspeaker front cavity;

the rear cavity is next to the rear output port;

the rear output port is provided with an acoustic resistance element on a side wall that is different from a side wall next to the rear cavity.

16. The hand-held device according to claim 10, wherein the loudspeaker assembly further includes:

a loudspeaker housing, configured to accommodate the at least one loudspeaker driver; and two output ports, connected to the loudspeaker housing.

17. The hand-held device according to claim 10, wherein the loudspeaker assembly includes at least one or a combination of:

a wideband or low-frequency loudspeaker with an omnidirectional polar pattern; and a wideband or high frequency loudspeaker, with a cardioid, dipole or other directional polar pattern, or with an omnidirectional polar pattern.

18. The hand-held device according to claim 10, wherein the loudspeaker assembly includes a loudspeaker housing, two omnidirectional loudspeaker units disposed in the loudspeaker housing, and two output ports connected to the loudspeaker housing;

or the loudspeaker assembly includes a first loudspeaker housing, an omnidirectional loudspeaker unit disposed in the first loudspeaker housing, a first output port connected to the first loudspeaker housing, a second loudspeaker housing, a cardioid loudspeaker unit disposed in the second loudspeaker housing, and a second output port and a third output port connected to the second loudspeaker housing;

or the loudspeaker assembly includes a first loudspeaker housing, a wideband loudspeaker unit disposed in the first loudspeaker housing, a first output port connected to the first loudspeaker housing, a second loudspeaker housing, a high frequency loudspeaker unit disposed in the second loudspeaker housing, and a second output port connected to the second loudspeaker housing, and the first and second output ports are facing towards a same direction;

or the loudspeaker assembly includes a first loudspeaker housing, a wideband loudspeaker unit disposed in the first loudspeaker housing, a first output port connected to the first loudspeaker housing, a second loudspeaker housing, a high frequency loudspeaker unit disposed in the second loudspeaker housing, and a second output port connected to the second loudspeaker housing, and the first and second output ports are facing towards different directions;

or the loudspeaker assembly includes a first loudspeaker housing, a first omnidirectional unit disposed in the first loudspeaker housing, a first output port connected to the first loudspeaker housing, a second loudspeaker housing, a dipole loudspeaker unit disposed in the second loudspeaker housing, and a second output port and a third output port connected to the second loudspeaker housing, a third loudspeaker housing, a second omnidirectional unit disposed in the third loudspeaker housing, and a fourth output port connected to the third loudspeaker housing, the first loudspeaker housing and the third loudspeaker housing are arranged at two sides of the second loudspeaker housing, and all the output ports are facing towards a same direction and are arranged symmetrically around a common center point;

or the loudspeaker assembly includes a first loudspeaker housing, an omnidirectional unit disposed in the first loudspeaker housing, a first output port and a second output port connected to the first loudspeaker housing, a second loudspeaker housing, a dipole loudspeaker unit disposed in the second loudspeaker housing, a third output port and a fourth output port connected to the second loudspeaker housing, all the output ports are facing towards a same direction and the first and second output ports are arranged symmetrically relative to the omnidirectional loudspeaker unit.

* * * * *